United States Patent [19]
Kanno et al.

[11] Patent Number: 5,125,382
[45] Date of Patent: Jun. 30, 1992

[54] ANTI-KNOCK DEVICE FOR AN ENGINE

[75] Inventors: Isao Kanno; Seiichi Tanaka, both of Hamamatsu, Japan

[73] Assignee: Sanshin Kogyo Kabushiki Kaisha, Hamamatsu, Japan

[21] Appl. No.: 559,290

[22] Filed: Jul. 30, 1990

[30] Foreign Application Priority Data

Jul. 31, 1989 [JP] Japan .................................. 1-196948

[51] Int. Cl.$^5$ .............................................. F02P 5/14
[52] U.S. Cl. ..................................................... 123/425
[58] Field of Search ............... 123/425, 419, 422, 416; 73/35; 364/431.08

[56] References Cited

U.S. PATENT DOCUMENTS

| 4,811,714 | 3/1989 | Akasu | 123/425 |
| 4,856,480 | 8/1989 | Nakajima et al. | 123/425 |
| 4,903,210 | 2/1990 | Akasu | 364/431.08 |
| 4,949,691 | 8/1990 | Abe et al. | 123/419 |
| 4,984,546 | 1/1991 | Shimomura et al. | 123/425 |

FOREIGN PATENT DOCUMENTS 59-213946 12/1984 Japan .................................. 123/425

Primary Examiner—Raymond A. Nelli
Attorney, Agent, or Firm—Ernest A. Beutler

[57] ABSTRACT

An anti-knock device is disclosed which selectively retards and advances ignition timing based on the detected knocking of the engine, the engine speed and throttle position. This anti-knock device operates to suppress engine knock and reduce hunting, without producing an unexpected and sudden change in engine output and speed.

10 Claims, 2 Drawing Sheets ly by the reference numeral
ANTI-KNOCK DEVICE FOR AN ENGINE

BACKGROUND OF THE INVENTION

This invention relates to an anti-knock device for controlling the ignition timing of an internal combustion engine, and more particularly to an improved arrangement for delaying and advancing the ignition timing in response to a knocking signal and at least one sensed running condition of the engine.

As is well known, ignition systems have been proposed that control the timing of the firing of the spark plugs of an engine in response to various engine conditions. Frequently, the spark timing is controlled in response to such factors as engine speed and throttle opening. Both mechanical and electronic systems have been provided for controlling the spark timing of the cylinders of a multi-cylinder engine.

Devices have also been proposed for suppressing engine knocking which can occur, for example, when engine timing is advanced to improve the power output of the engine. Such devices typically operate to retard the ignition timing when knocking occurs. However, in such anti-knock devices the ignition timing is usually advanced to its original timing within a set period of time or soon after the knocking is suppressed by the ignition delay. This can lead to the undesirable phenomenon known as hunting, in which the ignition timing is repeatedly retarded and then advanced. Japanese application 59-213946 proposed an arrangement wherein the time interval between the retarding and advancing of the ignition timing is increased by maintaining the retarded ignition timing for a certain period of time. While this arrangement generally reduces hunting to some extent, it tends to produce an unexpected and sudden change of the ignition timing, causing a sudden fluctuation in engine output. This sudden change in engine operation can, in turn, produce an uncomfortable environment in which to operate the engine.

It is, therefore, a principal object of this invention to provide an improved anti-knock device for an internal combustion engine which suppresses engine knock and reduces hunting, but does not produce an unexpected and sudden change in engine output and speed so as to provide a safer and more comfortable environment in which to operate the engine.

SUMMARY OF THE INVENTION

A first feature of this invention comprises an anti-knock device which is adapted to be embodied in an internal combustion engine and includes a knock sensor for detecting engine knocking and for generating a knocking signal if engine knocking is detected. At least one engine sensor, preferably an engine speed detector and/or a throttle position sensor, is provided for detecting at least one engine running condition. An ignition control circuit is also provided which retards ignition timing a first predetermined time if engine knocking is detected and if the value of the at least one engine running condition is detected to be greater than a first predetermined value. Thereafter, this ignition control circuit advances ignition timing only if the value of the at least one engine running condition is detected to be less than a second predetermined value.

A second feature of this invention is adapted to be embodied in a method for operating an internal combustion engine comprising the steps of detecting engine knocking and generating a knocking signal if engine knocking is detected, detecting at least one engine running condition, retarding ignition timing a first predetermined time if engine knocking is detected and if the value of the at least one engine running condition is detected to be greater than a first predetermined value, and thereafter advancing ignition timing only if the value of the at least one engine running is detected to be less than a second predetermined value.

DETAILED DESCRIPTION OF THE PREFERRED EMBODIMENT OF THE INVENTION

Figure 1:
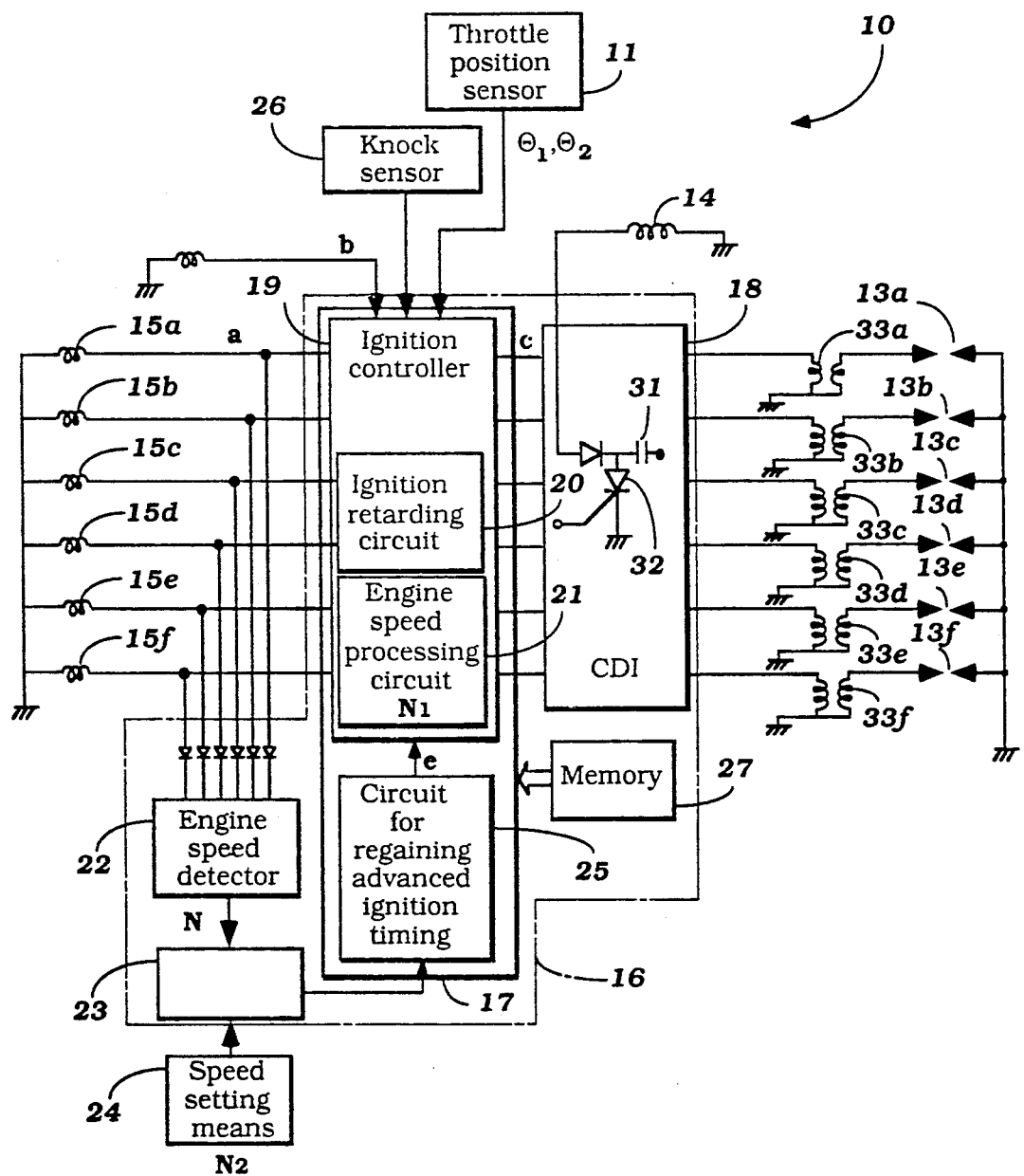
FIG. 1 is a schematic diagram showing the anti-knock device for use in connection with an internal combustion engine.

Referring now in detail to the drawings and initially to FIG. 1, an anti-knock device constructed in accordance with this invention is identified general10. The anti-knock device 10 is adapted to be embodied in an internal combustion engine. The invention may be employed in conjunction with a wide variety of internal combustion engines including single and multiple cylinder engines as well as engines operating on two or four stroke cycles.

The engine in the illustrated embodiment is of the six cylinder type and includes six individual cylinder bores that slidably support pistons that are connected by means of connecting rods to a crankshaft for providing output power from the engine.

In one type of engine, a fuel/air charge is delivered to sealed crankcase chambers associated with each of the cylinder bores by means of a suitable charge former such as individual carburetor barrels that draw air from an air inlet device and deliver it to the crankcase chambers through an intake manifold. Throttle valves are positioned in the individual carburetor barrels for controlling the flow of the fuel/air mixture thereto in a known manner. The throttle valves are all operated in sequence by means of a throttle valve linkage that is controlled by a remotely positioned operator through a bowden wire actuator. A Throttle position sensor 11 is associated with the linkage for providing signals that are indicative of the position or opening of the throttle valves for a purpose and in a manner to be described.

The fuel/air charge which is delivered to the individual crankcase chambers associated with the cylinder bores is transferred to the area above the pistons during the downward movement of the pistons through suitable scavenge passages. This charge is then fired in the combustion chambers by means of individual spark plugs 13a through 13f and exhausted from exhaust ports.

The spark plugs 13a through 13f are fired from an ignition system which preferably includes a magneto generator assembly which is associated with a flywheel that is affixed for rotation with the crankshaft. The magneto generator preferably includes a series of permanent magnets that are affixed to the flywheel and which cooperate with a charging coil 14 for generating a charging current in the coil during rotation of the flywheel. In addition, there is provided a plurality of pulser coils 15a through 15f that cooperate with further magnets for generating individual timing pulses when the pistons associated with the individual cylinders are at an appropriate position. One pulser coil is associated with each of the cylinders and spark plugs.

The individual signals from the pulser coils 15a through 15f are transmitted to an ignition control circuit shown schematically and outlined in phantom at 16 which includes a main ignition timing circuit 17 and a capacitor discharge ignition (CDI) circuit 18.

This main ignition timing circuit 17 comprises an ignition controller 19 which includes ignition retarding means 20, and means for processing the detected engine speed 21 wherein a first predetermined engine speed N& is stored. An engine speed detector 22 receives signals from each of the pulser coils 15a through 15f for determining the speed of the engine N. This detected engine speed N is then transmitted to a comparator 23 which also receives signals from a speed setting means 24 which inputs a second predetermined engine speed $N_2$ to the comparator 23. This comparator 23 compares the engine speeds N and $N_2$ and outputs signals indicative of these engine speeds and their comparison to the main ignition timing circuit 17, where the signals are transmitted to a circuit means for regaining advanced ignition timing 25 and then to the ignition controller 19 including the engine speed processing means 21. controller 19 including the circuit means 25 also interfaces with a memory unit 27 for determining when to advance ignition timing.

The main ignition timing circuit 17 and ignition controller 19 also receive an input knocking signal from a knock sensor 26, as well as input signals from the throttle position sensor 11. The throttle position sensor 11 senses the position of the throttle valves or throttle opening $\theta$ and outputs a signal indicative of this sensed position $\theta$ to the ignition controller 19 when $\theta$ is less than a first predetermined value of $\theta_1$ or when $\theta$ is less than a second predetermined value of $\theta_2$.

Based on these signals, the ignition controller 19 of the main ignition timing circuit 17 calculates a desired or optimum ignition timing for a given engine speed N and throttle valve position $\theta$. Ignition signals for each of the individual cylinders indicative of this calculated timing are then generated and transmitted to the CDI circuit 18 where a thyristor 32 discharges a capacitor 31 for firing the spark plugs 13a through 13f by means of individual ignition coils 33a through 33f, one associated with each of the spark plugs 13a through 13f.

In accordance with the invention, the ignition timing can be retarded and subsequently advanced in a manner to be described based on signals generated by the knock sensor 26 if engine knocking is detected. The knocking signal received by the main ignition timing circuit 17 is processed in conjunction with the detected engine speed N and the throttle position sensor signals so as to provide a basis for suppressing engine knocking without producing large fluctuations in engine output.

Figure 2:
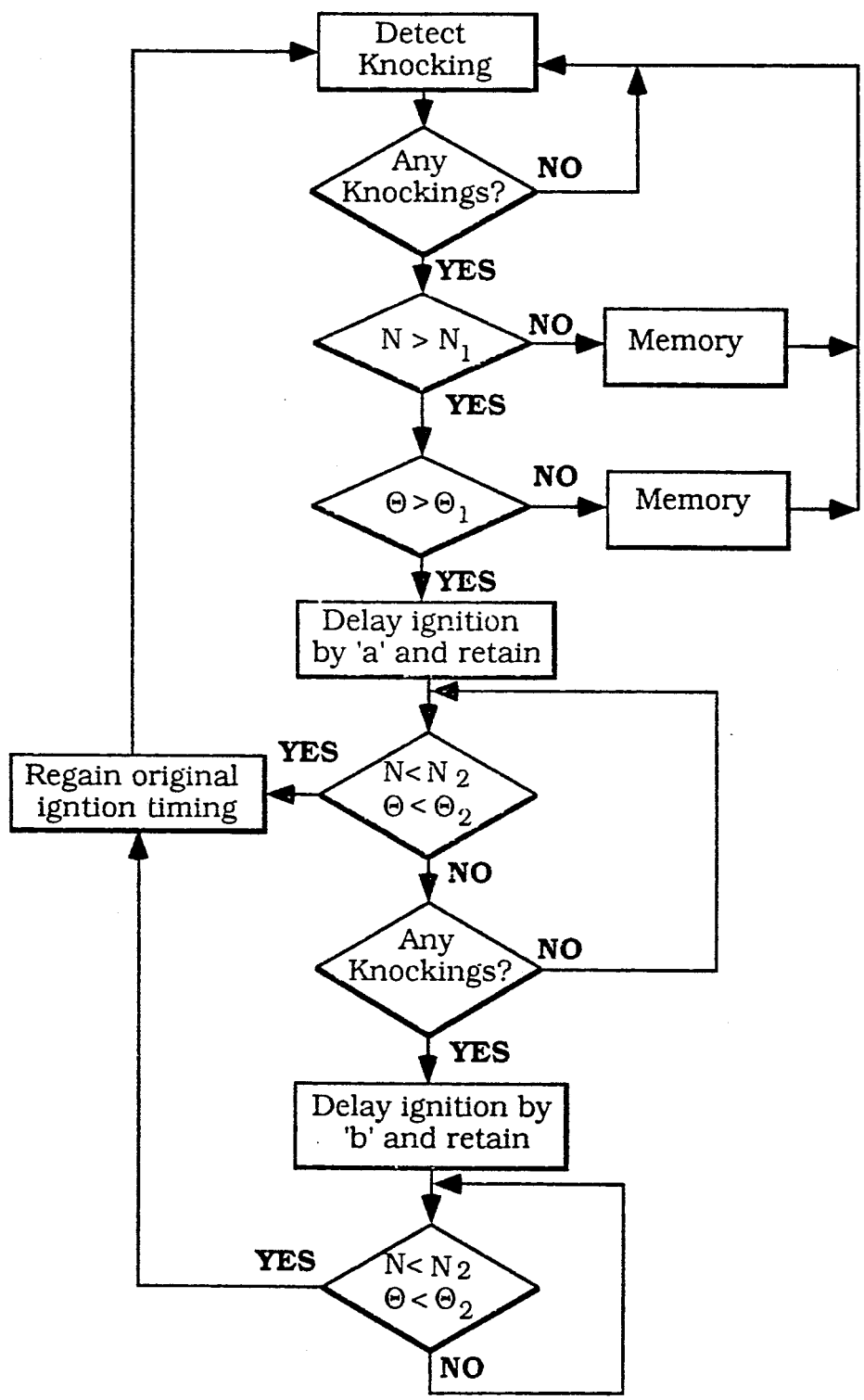
FIG. 2 is a flow chart showing the operation of the anti-knock device.

Referring now to FIG. 2, in addition to FIG. 1, a flow chart is depicted illustrating the operation of the antiknock device 10. At the outset, the presence or absence of engine knocking is detected by the knock sensor 26. If no engine knocking is detected, the program repeats. However, if engine knocking is detected, the detected engine speed N received by the engine speed processing means 21 is compared to the stored first predetermined value for engine speed $N_1$. If N is less than or equal to $N_1$, the engine speed N is stored in a memory and the program repeats. If, however, N is greater than $N_1$, the throttle position $\theta$ detected by the throttle position sensor 11 is determined. If $\theta$ is less than or equal to the first predetermined value for throttle opening $\theta_1$, the throttle opening $\theta$ is stored in a memory and the program repeats. If $\theta$ is greater than $\theta_1$, ignition retarding means 20 within the ignition controller 19 retards ignition timing a predetermined time of "a" crank angle degrees to suppress knocking.

With this arrangement, the spark timing is not retarded when the engine is running at a low speed of at or below $N_1$, and even when N is greater than $N_1$ if the throttle opening $\theta$ is at or below a value of $\theta_1$. By not retarding the ignition timing in these two situations, the anti-knock device 10 prevents a sudden drop in engine speed N which may cause the engine to stall or unstable running of the engine which may otherwise occur if spark timing is retarded at low engine speeds or at small throttle openings. The system can also be arranged so that spark timing is not retarded only when the engine speed N is running at or below N, or only when the throttle opening $\theta$ is at or below a value of $\theta_1$.

As previously noted, if the engine speed N is greater than the predetermined value $N_1$ and if the throttle opening $\theta$ is greater than the predetermined value $\theta_1$, the ignition timing is retarded 'a' crank angle degrees. Afterward, engine speed N and throttle opening $\theta$ are again detected. If this timing delay of 'a' crank angle degrees causes the engine speed N to fall below the second predetermined value for engine speed $N_2$ and causes the throttle opening $\theta$ to decrease below, the second predetermined value for throttle opening $\theta_2$, the circuit means for regaining advanced ignition 25 inputs a signal to the ignition controller 19 to cancel the retarded timing and advance the timing to its original timing point, after which the program repeats.

On the other hand, if the timing delay of 'a' crank angle degrees does not cause the engine speed N to fall below $N_2$ and does not cause the throttle opening $\theta$ to decrease below the value $\theta_2$, engine knocking is again detected. If knocking is not detected at this point, the program returns to the point where N is compared to $N_2$ and $\theta$ is compared to $\theta_2$. However, if knocking is detected, the ignition retarding means 20 further retards the ignition timing a second predetermined time of 'a'+'b' crank angle degrees. If this further timing delay reduces the engine speed N so that it is less than $N_2$ and makes the throttle position $\theta$ less than $\theta_2$, the circuit means 25 inputs a signal to the ignition controller 19 to cancel the retarded ignition timing and restore the original timing, after which the program repeats.

If, however, a retarded ignition timing of 'a'+'b' crank angle degrees still does not produce an engine speed N less than $N_2$ and a throttle opening $\theta$ less than $\theta_2$, $N_2$ and a throttle opening $\theta$ less than $\theta_2$, N is again compared to $N_2$. $N_2$ and $\theta$ is again compared to $\theta_2$.

In this embodiment, it is preferable to set the value $N_1$ greater than the value $N_2$ so as to avoid hunting, wherein retarding and advancing of the ignition timing are repeated to often. However, other predetermined speed settings may also be used such as where $N_1$ and $N_2$ are equal.

It is to be understood that the foregoing is a description of a preferred embodiment of this invention and that various changes and modifications may be made without departing from the spirit and scope of the invention, as defined by the appended claims.

We claim:

1. An anti-knock device for an internal combustion engine comprising a knock sensor for detecting engine knocking and which generates a knocking signal if engine knocking is detected, at least one engine sensor for detecting at least one engine operating parameter expressible as a numerical value, an ignition control circuit which retards ignition timing a first predetermined time if engine knocking is detected and if the value of the at least one engine operating parameter is detected to be greater than a first predetermined value and thereafter advances ignition timing only if the value of the at least one engine operating parameter decreases to less than a second predetermined value.

2. An anti-knock device as recited in claim 1, wherein the at least one engine operating parameter is engine speed.

3. An anti-knock device as recited in claim 2 wherein said first predetermined value is greater than said second predetermined value so as to avoid hunting.

4. An anti-knock device as recited in claim 1, wherein if, after said ignition control circuit retards ignition timing said first predetermined time, the value of the at least one engine operating parameter is not detected to be below said second predetermined value and if engine knocking is still detected said ignition control circuit delays ignition timing a second predetermined time greater than said first predetermined time.

5. An anti-knock device as recited in claim 4, wherein if, after said ignition control circuit retards ignition timing said second predetermined time, the value of the at least one engine operating parameter is detected to be below said second predetermined value said ignition control circuit advances ignition timing.

6. An anti-knock device as recited in claim 1, wherein the at least one engine operating parameter is engine speed and throttle position.

7. An anti-knock device as recited in claim 1, wherein said ignition control circuit comprises a main ignition timing circuit including an ignition controller for calculating ignition timing based on signals received from said knock sensor and the at least one engine sensor.

8. An anti-knock device as recited in claim 7, wherein said ignition control circuit further comprises ignition retarding means for selectively retarding ignition timing based on signals received from said knock sensor and the at least one engine sensor.

9. An anti-knock device as recited in claim 8, wherein said ignition control circuit further comprises circuit means for regaining advanced ignition timing based on signals received from said knock sensor and the at least one engine sensor.

10. A method for operating an internal combustion engine, comprising the steps of detecting engine knocking and generating a knocking signal if engine knocking is detected, detecting at least one engine operating parameter expressible as a numerical value, retarding ignition timing a first predetermined time if engine knocking is detected and if the value of the at least one engine operating parameter is detected to be greater than a first predetermined value, and thereafter advancing ignition timing only if the value of the at least one engine operating parameter is detected to be less than a second predetermined value.

* * * * *